July 28, 1970 J. H. ENGLEMAN 3,521,868
METHOD OF AND MEANS FOR CONSERVING HEAT RESIDENT IN HOT METAL BILLETS
Filed July 12, 1968 2 Sheets-Sheet 1
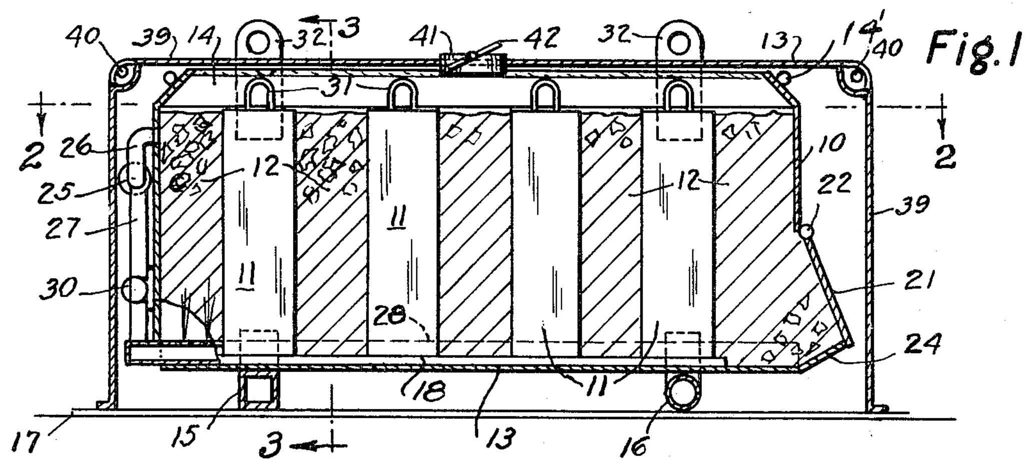
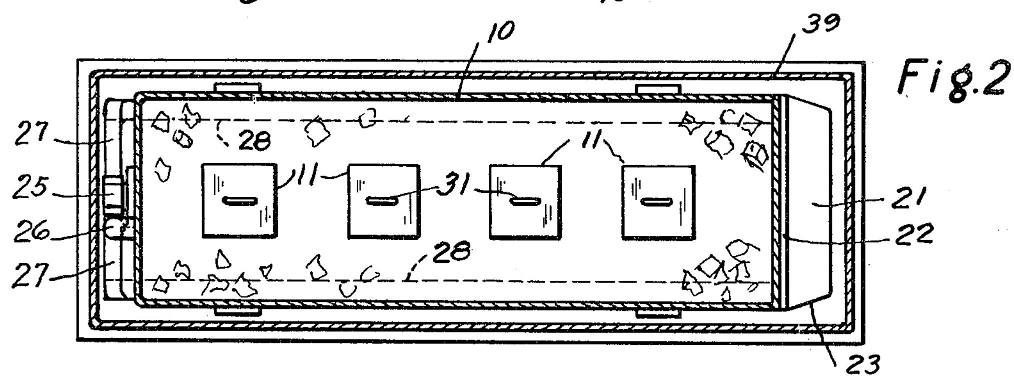
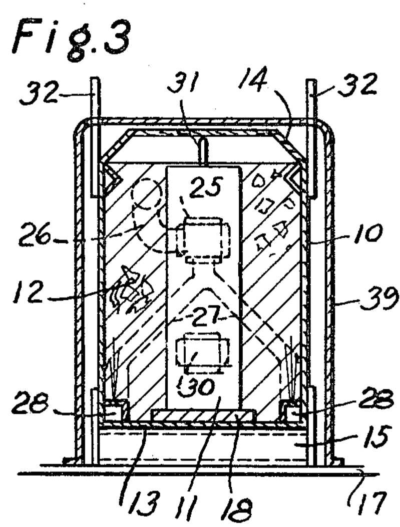
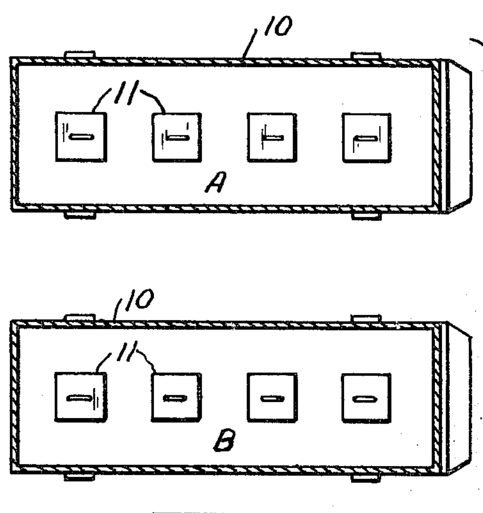
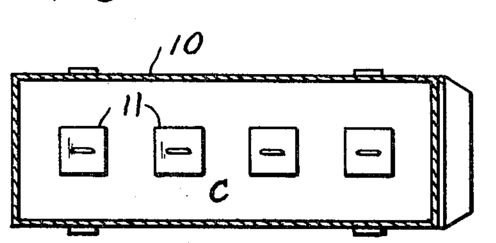
INVENTOR.
Joseph H. Engleman
BY
Fred C. Matheny
ATTORNEY

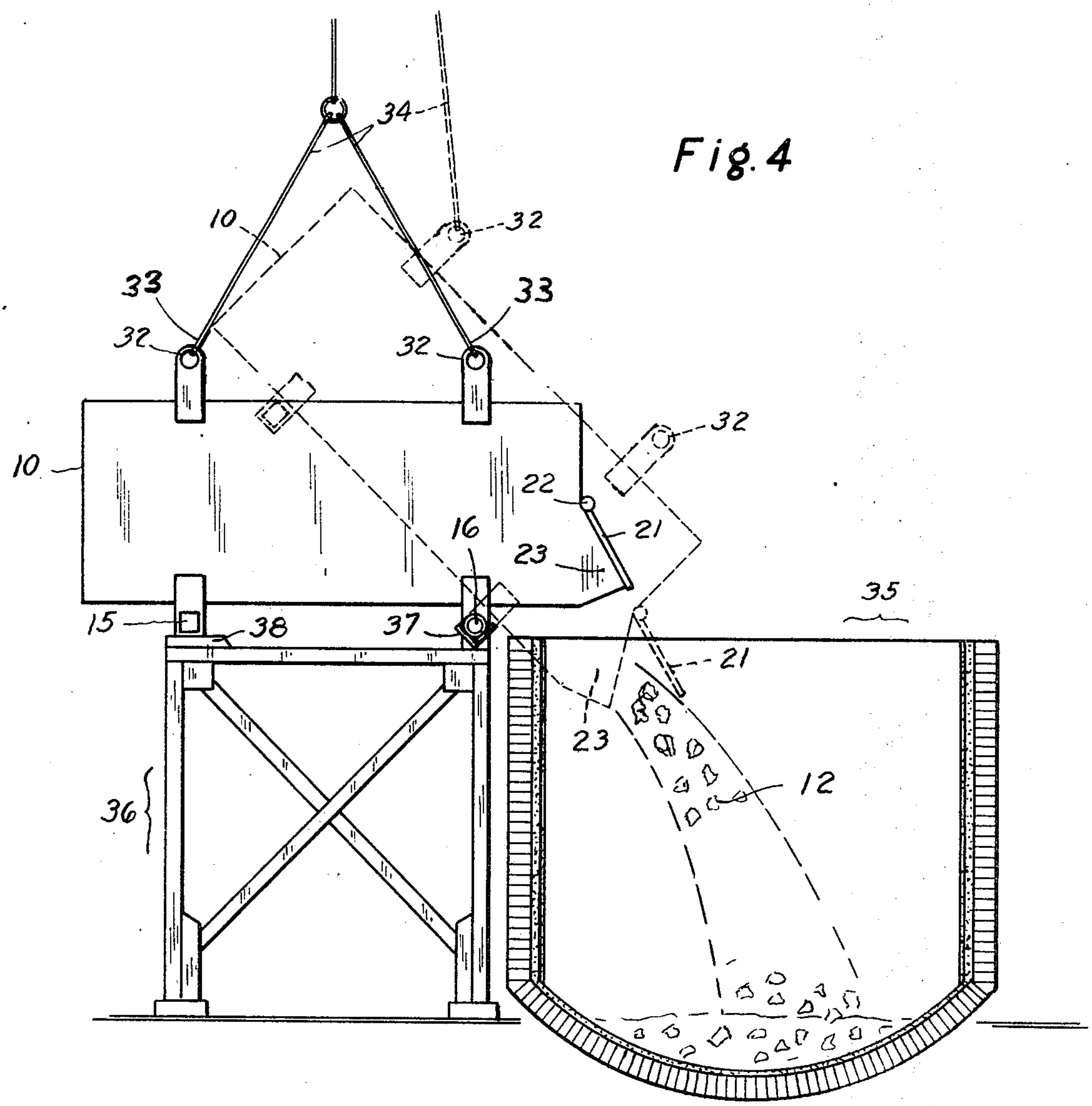
INVENTOR.
Joseph H. Engleman
BY
Fred C. Matheny
ATTORNEY

United States Patent Office 3,521,868 Patented July 28, 1970

3,521,868

METHOD OF AND MEANS FOR CONSERVING HEAT RESIDENT IN HOT METAL BILLETS

Joseph H. Engleman, P.O. Box 555, Seattle, Wash. 98111

Filed July 12, 1968, Ser. No. 744,480
Int. Cl. F27b *21/04*
U.S. Cl. 263—40 9 Claims

ABSTRACT OF THE DISCLOSURE

Most of the heat resident in the billets at the time they are removed from the billet molds is utilized to pre-heat metal scrap before placing the scrap in a melting furnace. This is done by placing the hot billets in spaced apart relation in a receptacle, placing the metal scrap around them, maintaining a slow circulation of the air within the receptacle while the scrap metal absorbs much of the heat from the billets and then removing the billets and transferring the pre-heated scrap to a melting furnace.

BACKGROUND OF THE INVENTION

Field of the invention

The invention relates to a method of and means for reducing the cost of melting metals, particularly iron or steel, by utilizing the usually wasted heat in previously melted metal to pre-heat charges of metal which are to be melted and in this way reducing the amount of heat and shortening the time required for melting the pre-heated charges. The invention is well adapted for use with electric metal melting furnaces but can be used where metal is being melted in other ways.

Description of the prior art

In melting scrap metal it is common practice to introduce the metal into the furnace at about atmospheric temperature, melt it and then discharge the molten metal into billet molds. Usually the heat in the metal at the time it is poured into the billet molds is not used and is a total loss. Some cooling of the metal occurs in the billet molds but the billets are liable to come out of the molds at a temperature in the order of two thousand degrees Fahrenheit.

SUMMARY OF THE INVENTION

A general object of my invention is to conserve and make use of a substantial part of the heat resident in hot metal billets at the time they are removed from billet molds.

Another object is to provide a simple, practical and inexpensive method of conserving the heat in hot metal billets by causing it to be transferred to cooler metal to pre-heat the cooler metal preparatory to melting it thereby reducing the cost of melting the pre-heated metal.

Another object is to provide simple and efficient apparatus for use in bringing about the transfer of heat from hot metal billets to colder metal scrap preparatory to melting the scrap, said apparatus being durable and needing little repair.

Another object is to provide heat transfer and material handling apparatus which is well adapted for handling and use by an ordinary crane and other conventional equipment of the type usually found in foundries where metal is melted and to provide apparatus which does not require a high degree of skill to use.

Other objects of the invention will be apparent from the following description and accompanying drawings.

DESCRIPTION OF THE DRAWINGS

FIG. 1 is a view in longitudinal section with parts in elevation of a heat exchange receptacle made in accordance with my invention showing billets and scrap metal therein.

FIG. 2 is a view partly in section and partly in plan taken substantially on broken line 2—2 of FIG. 1.

FIG. 3 is a view partly in vertical section and partly in elevation taken substantially on broken line 3—3 of FIG. 1.

FIG. 4 is a view partly in elevation and partly in section illustrative of my preferred method of transferring pre-heated scrap metal from a receptacle to a melting furnace.

FIG. 5 is a plan diagram illustrative of a multiple stage method of using several of my heat exchange receptacles in such a manner as to extract and utilize a larger percentage of the heat from the billets, by progressive use of more than one receptacle, than can be extracted in a one stage operation using one receptacle.

Like reference numerals refer to like parts throughout the several views.

DESCRIPTION OF THE PREFERRED EMBODIMENTS

My method and apparatus is herein described as applied to the pre-heating of metal scrap, which usually is steel scrap, but it is intended that the term metal scrap, as herein used, is to apply to metals in other than scrap form which can be handled in bulk and will absorb the heat from the billets.

In the preferred form of my invention I provide a box shaped receptacle 10 of suitable size and dimensions to function as a soaking pit and receive a predetermined number of hot metal billets 11 as they are removed from conventional billet molds and in addition to hold a predetermined amount of scrap metal 12 which embeds the billets 11 and is to be pre-heated by them preparatory to melting the scrap. Preferably but not essentially the receptacle 10 is heat insulated. This may be done by coating it with heat insulating material. The receptacle 10 has a flat bottom 13 and is deep enough so the billets 11 can be positioned upright and in spaced apart relation and the metal scrap can be poured around them and will substantially envelop them. Preferably a flat cast iron plate 18 is disposed in the bottom of the receptacle for the hot billets to rest on. Obviously one cast iron plate 18 large enough to receive all of the billets in the receptacle can be used or an individual cast iron plate can be used for each billet. The cast iron plate or plates protect the bottom 13 of the receptacle and preclude danger of the hot billets welding to the receptacle bottom because the billets, usually steel, will not weld to cast iron.

A cover 14 is provided for the top of the receptacle 10 and has lift members 14' by which it may be handled in placing it on and removing it from said receptacle. At least two transverse support members 15 and 16 are provided on the bottom of the receptacle 10. When the receptacle is resting on a floor 17 these support members space it far enough above the floor to admit the forks of a fork lift truck to be inserted under the receptacle for moving it. Foundries where this equipment is used are usually equipped with a conventional fork lift truck. Preferably the support member 16 is a cylindrical pipe which serves as a pivot member when the receptacle is being emptied as shown in FIG. 4. Suitable lift plates 32 are secured to the receptacle 10 near each corner thereof and extend upwardly therefrom. The cover 14 fits inside of these lift plates 32 and is positioned and held in place by them.

The end of the receptacle 10 shown at the right in FIGS. 1, 2 and 4 is provided with a discharge opening which is normally closed by a door 21. Preferably the discharge opening is the full width of the receptacle. The door 21 is supported from its upper edge by a hinge 22 which permits it to swing outwardly. Preferably the side walls and bottom of the receptacle 10, at the discharge end thereof, are extended to form the side walls 23 and a bottom wall 24 of a stubby discharge chute with which the door 21 cooperates. The bottom 24 of this chute is upwardly inclined relative to the bottom 13 of the receptacle and the chute door 21 is outwardly inclined from top to bottom. This minimizes the danger of the scrap pressing against the door when the receptacle is horizontal and the door 21 will normally remain closed but will swing open and permit the scrap metal to discharge freely when the receptacle is tilted into a position as shown in FIG. 4.

A faster exchange of heat between the billets 11 and the scrap metal is obtained by providing for a circulation of the air within the closed receptacle 10. I preferably do this by providing an electrically driven air circulator or blower 25 which is connected by air conduit means 26 with the upper portion of the receptacle 10 and by discharge conduit means 27 with preferably two perforated air distributing conduits 28 and 29 positioned in the lower corner portions of the receptacle 10. Maintaining a continuous but slow circulation of the air within the receptacle 10 through the metal scrap and around the hot billets hastens the transfer of the heat from the billets to the scrap.

I further provide means for vibrating the receptacle 10 to settle the scrap metal around the billets 11 and prevent large voids from being formed in the scrap metal. One way to do this is to secure a conventional vibrator 30 of electrically driven type and of proper size to one end of the housing 10 and operate this vibrator for a few minutes after each charge has been placed in the receptacle 10. The vibrator 30 is only operated for a short time for each charge and neither it or the blower 25 consume much current.

An outer heat insulating housing 39, the use of which is optional, is provided. This housing 39 is of inverted box shape, is of larger size than the receptacle 10 and it can be lowered over the receptacle 10 to provide between its walls and the walls of the receptacle 10 a dead air space for insulating purposes or which, if desired can be ventilated. Lift rods 40 are secured to housing 39 preferably in suitable recesses in the ends of said housing 39. A vent tube 41 having a damper type valve member 42 to regulate or close its opening is connected with the top portion of the housing 39. The vent tube 41 registers with a suitable opening in the cover plate 14. The damper 12 will ordinarily be in a closed position but it can be opened to permit the escape of smoke and fumes from housing 10 if the scrap carries combustible matter, such as grease. Obviously an extension pipe can be connected with the vent tube 41. If the outer housing 39 is not to be used in the process the opening in the cover 14 which registers with the vent tube 41 can be closed by any suitable plate like covering. Openings, not shown, are provided at suitable locations in outer housing 39 to fit over the upwardly protruding lift plates 32.

In the use of this apparatus all of the parts and materials are handled with any suitable available conventional crane. Each billet 11 has an eye member 31 fixed to one end thereof for handling the billet. Suitable lift means having four or more chains or cables 34, FIG. 4, operated by the crane and each terminating in a hook at its lower end 35 is used in handling the billets 11, the receptacle 10, the cover 14, the outer housing 39 if it is used, the trestle 36, which is portable, and the scrap metal 12. The billets 11 can be handled one at a time or in multiple. As the billets 11 are taken out of the molds they are positioned upright in spaced apart relation in the receptacle 10. The scrap 12 is picked up in any suitable bucket or by electromagnetic means and placed in the receptacle 10 around the hot billets. The cover 14 is applied and the housing 10 is vibrated to settle the scrap around the billets. If the outer housing 39 is to be used it is lowered into place. The air circulator 25 is started and can operate continuously during the process. The charged receptacle 10 is then allowed to stand for a predetermined length of time. This can be long enough for the temperatures of the billets and scrap metal to approximately equalize. The outer housing 39, if used, and the cover 14 are then lifted off and the billets 10 lifted out and disposed of. The four lift chains 34 are then attached to the lift plates 32, the receptacle 10 lifted and placed on a suitable portable supporting structure 36, FIG. 4, herein termed a trestle, which is positioned alongside of a metal melting furnace 35. The transverse pipe 16 on the bottom of receptacle 10 is placed on a V-shaped bracket 37, one or more of which are provided on the trestle 36 adjacent the furnace 35 and the other receptacle support member 15 is placed on a rigidly attached support 38 on the trestle 36. The two chains 34 nearest the furnace 35 are then disconnected from the lift plates 32 to which they have been attached and the receptacle 10 is lifted and tilted on the pipe 16 by the other two chains 34 into a dumping position in which it is shown by dash lines, FIG. 4, to discharge the preheated scrap into the furnace.

The percentage of heat which can be transferred from hot billets into cold metal scrap will vary in accordance with the relative weights of the billets and the charge of scrap and in accordance with the length of time allowed for exchange of heat. If the weights of a set of billets and a scrap charge are approximately equal and the temperatures are allowed to substantially equalize it is possible, by a single treatment in one receptacle, to conserve about one half of the heat resident in the set of billets at the beginning of the treatment. By using more than one receptacle and successively or progressively transferring the billets to different receptacles and embedding them in cold or partly pre-heated scrap metal a substantially larger percentage of the heat in the billets can be transferred to the metal scrap charges.

For instance, three receptacles A, B and C, as shown diagrammatically in FIG. 5 can be used to advantage in some instances in approximately the following manner: (1) Put hot billets and cold metal scrap into receptacle A and let their temperatures substantially equalize. (2) Transfer the partly cooled billets from receptacle A to receptacle B and embed them in cold scrap, put the preheated scrap from receptacle A into the furnace and let the temperatures in receptacle B substantially equalize. (3) Transfer the partly cooled billets from receptacle B to receptacle C and embed them in cold scrap for a third stage of heat transfer. The partly pre-heated scrap from receptacle B can go into the furnace or, if hot billets are available they can be placed in receptacle A and the scrap from receptacle B transferred to receptacle A for further pre-heating. One way of transferring metal scrap from one receptacle to another is to use electromagnetic means to pick it up and move it. Thus it will be seen that the hot billets can be subjected to several stages of heat transfer and much more than one half of their initial heat transferred to colder metal scrap.

Also it will be apparent that, by using several receptacles, such as A, B and C, FIG. 5, and transferring the charges of scrap from one receptacle to another and temperatures of these scrap charges can be progressively raised to a point much above the temperature which can be attained by one stage of treatment. In instances where a number of receptacles, such as A, B and C are available their method of use can be widely varied depending on operating conditions, such as time required or alloted for heat exchange, melting furnace capacity, time required for melting the scrap charges, supply of hot billets available and the like.

Obviously changes in my method and apparatus, as hereinbefore disclosed, can be made within the scope of the following claims.

I claim:

1. The method of conserving heat in the operation of a metal melting furnace in which the hot metal from the furnace is molded into billets, which comprises placing the hot billets in upright spaced apart relation in a substantially air tight receptacle; introducing metal scrap into the receptacle and substantially submerging the billets in the metal scrap; tightly closing the receptacle; hastening the transfer of a substantial percentage of the heat from the billets into the metal scrap by providing a continuous circulation of the air in the receptacle for a substantial period of time; opening the receptacle; removing the billets; and immediately transferring the pre-heated metal scrap to the furnace.

2. The method as claimed in claim 1 which includes the additional step of minimizing voids in the metal scrap and packing the metal scrap more densely around the hot billets by vibrating the receptacle immediately after the hot billets and scrap have been placed therein.

3. Apparatus wherein hot metal billets are embedded in colder metal scrap for conserving heat by transferring the heat from the billets to the metal scrap and pre-heating the metal scrap preparatory to melting it, comprising a portable receptacle of a depth at least equal to the length of the billets and of greater length than width, said receptacle having side walls and end walls and a flat bottom and an open top and having a discharge opening in one end thereof flush with its bottom; a door normally closing said discharge opening, said door and the walls of said receptacle being substantially air tight; a substantially air tight cover adapted to close the open top of said receptacle; and at least two upwardly extending lift plates rigid with said receptacle adjacent each end thereof, said lift plates being adapted to be engaged by lift means, whereby said receptacle may be lifted and tilted in discharging material contained therein through said discharge opening.

4. The apparatus as claimed in claim 3 in which a discharge chute extends around the bottom and two ends of the discharge opening, said chute having a bottom wall flush with the bottom of the receptacle and protruding outwardly from the receptacle and having triangularly shaped end walls the outer edges of which are inclined toward the receptacle from the bottom of the chute upwardly, the top edge of the door being hinged to the receptacle adjacent the upper edge of the discharge opening, the door being self-closing against the inclined outer edges of the end walls of the chute when the receptacle is horizontal and self opening when the receptacle is tilted into a material discharging position.

5. The apparatus as claimed in claim 3 in which a power operated vibrator capable of imparting substantial vibration to said receptacle is secured to a wall of said receptacle externally thereof.

6. The apparatus as claimed in claim 3 in which at least one flat cast iron plate is disposed within and rests on the bottom of said receptacle and serves as a billet support.

7. The apparatus as claimed in claim 3 in which a power operated air circulator is connected by air intake means with the upper portion of said receptacle and by air discharge means with the lower portion of said receptacle, said air circulator being capable of maintaining a continuous circulation of the air in the receptacle through the scrap metal in the receptacle.

8. The apparatus as claimed in claim 3 in which an outer housing of larger dimensions than said receptacle, having side walls and a top wall and an open bottom is adapted to be lowered over said receptacle and provides a heat insulating space between its walls and the walls of the receptacle.

9. The apparatus as claimed in claim 3 in which at least two spaced apart transverse support members are rigidly secured to the bottom of the receptacle, the support member nearest the discharge opening in the receptacle being externally cylindrical and serving as a pivot member on which the receptacle is tilted in discharging material therefrom through said discharge opening.

References Cited

UNITED STATES PATENTS

| | | | |
|---|---|---|---|
| 1,792,423 | 2/1931 | Hain | 263—40 |
| 3,390,872 | 2/1968 | Ciochetto | 263—40 XR |

JOHN J. CAMBY, Primary Examiner

U.S. Cl. X.R.

263—47